US009047885B2

(12) United States Patent
Sugiyama et al.

(10) Patent No.: US 9,047,885 B2
(45) Date of Patent: Jun. 2, 2015

(54) PERPENDICULAR MAGNETIC RECORDING HEAD AND METHOD OF MANUFACTURING THE SAME

(75) Inventors: Mikito Sugiyama, Kanagawa (JP); Isao Nunokawa, Kanagawa (JP); Hiroyuki Hoshiya, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 1423 days.

(21) Appl. No.: 12/313,608

(22) Filed: Nov. 21, 2008

(65) Prior Publication Data

US 2009/0154013 A1    Jun. 18, 2009

(30) Foreign Application Priority Data

Dec. 14, 2007  (JP) ................................. 2007-323800

(51) Int. Cl.
*G11B 5/127* (2006.01)
*G11B 5/11* (2006.01)
*G11B 5/31* (2006.01)

(52) U.S. Cl.
CPC .............. *G11B 5/1278* (2013.01); *G11B 5/112* (2013.01); *G11B 5/3116* (2013.01); *G11B 5/3146* (2013.01); *G11B 5/315* (2013.01); *G11B 5/3163* (2013.01)

(58) Field of Classification Search
None
See application file for complete search history.

(56) References Cited

U.S. PATENT DOCUMENTS

| 6,954,340 | B2 * | 10/2005 | Shukh et al. .................. 360/317 |
| 2006/0198050 | A1 * | 9/2006 | Mochizuki et al. ........... 360/126 |
| 2007/0019327 | A1 | 1/2007 | Maruyama et al. |
| 2007/0217069 | A1 | 9/2007 | Okada et al. .................. 360/126 |
| 2007/0223141 | A1 * | 9/2007 | Gomi et al. .................... 360/126 |
| 2007/0253107 | A1 * | 11/2007 | Mochizuki et al. ........... 360/126 |

FOREIGN PATENT DOCUMENTS

| CN | 1912995 A | 2/2007 | |
| CN | 2007/10086276.6 | 9/2007 | ............. G11B 5/127 |
| JP | 60-136015 | 7/1985 | |
| JP | 2004-127480 | 4/2004 | |
| JP | 2007-024120 | 2/2007 | |

OTHER PUBLICATIONS

Chinese Office Action from application No. 200810183769.6 dated Jul. 27, 2011 (no translation).

* cited by examiner

*Primary Examiner* — Mark Ruthkosky
*Assistant Examiner* — Lisa Chau
(74) *Attorney, Agent, or Firm* — Zilka-Kotab, PC

(57) ABSTRACT

Embodiments of the present invention provide a perpendicular magnetic recording head which can suppress reduction in recording field and efficiently reduce a fringe field. According to one embodiment, a side shield disposed at a side of each side face in a cross track direction of a main pole is arranged at a far leading side compared with the main pole.

18 Claims, 12 Drawing Sheets

Fig. 4
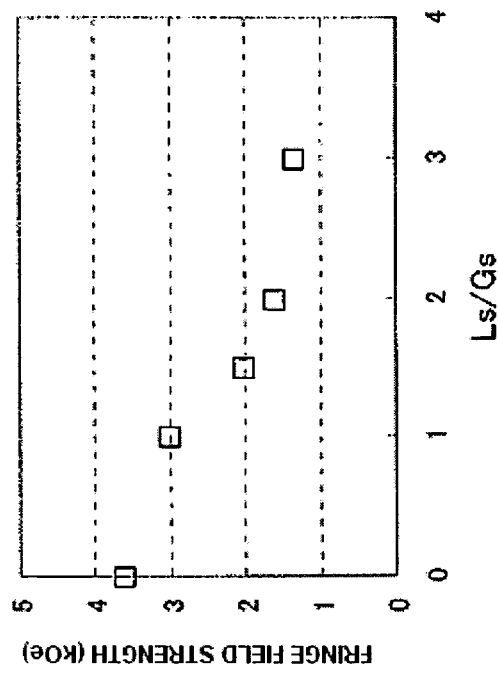
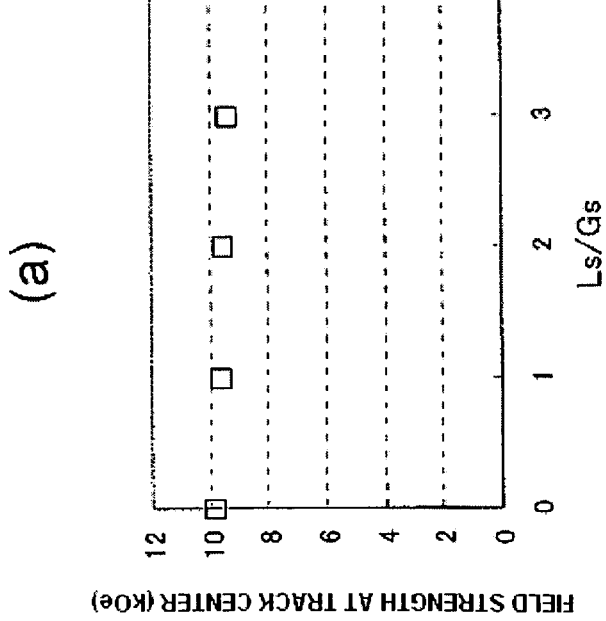

PERPENDICULAR MAGNETIC RECORDING HEAD AND METHOD OF MANUFACTURING THE SAME

CROSS-REFERENCE TO RELATED APPLICATION

The instant nonprovisional patent application claims priority to Japanese Patent Application No. 2007-323800 filed Dec. 14, 2007 and which is incorporated by reference in its entirety herein for all purposes.

BACKGROUND OF THE INVENTION

To achieve high recording density of a HDD (Hard disk drive), it is essential to achieve high field strength to enable recording into a medium having high thermal stability, and field distribution that does not induce degradation of a recording pattern of an adjacent track in a high track density recording. However, the above two points are generally contrary to each other. That is, in a head structure for generating a high magnetic field, field expansion is also large in a track width direction. On the other hand, with increases in track density, a problem of signal degradation in an adjacent track, which may occur during recording, begins to emerge. This is a phenomenon that even if a leakage field to an adjacent track (hereinafter, called fringe field) is equal to or lower than a magnetization reversal field of a recording medium, signal quality of the adjacent track is degraded as a result of repeated recording.

As an approach for preventing field leakage to an adjacent track while keeping a maximum field, a magnetic shield may be provided on a side face in a track width direction of a main pole. Japanese Patent Publication No. 2004-127480 ("Patent document 1") and Japanese Patent Publication No. 2007-35082 ("Patent Document 2") disclose a method where a nonmagnetic film and a soft-magnetic film are formed on each side face of a main pole having an inverted trapezoidal shape formed by ion milling. Japanese Patent Publication No. 2007-24120 ("Patent document 3") discloses a method where as means of forming a main pole having an inverted trapezoidal shape in a manner of self-aligning with a side shield, a groove having a wedge-shaped section profile is formed in a magnetic film, and a nonmagnetic film and a magnetic film are formed in the groove.

In order to increase field strength, a method is considered, in which a sub pole is provided at a position retracted from an air-bearing surface in a direction perpendicular to the air-bearing surface at an end in a down track direction of a main pole. For example, Japanese Patent Publication No. 60-136015 ("Patent document 4") and Japanese Patent Publication No. 2006-244671 ("Patent document 5") describe a method where a magnetic film is added to a leading side of a main pole, respectively. However, generally in these methods, field expansion is caused with increase in field strength, resulting in increase in fringe field. Therefore, track density cannot be increased, and consequently high density recording cannot be achieved.

BRIEF SUMMARY OF THE INVENTION

Embodiments of the present invention provide a perpendicular magnetic recording head which can suppress reduction in recording field and efficiently reduce a fringe field. According to the embodiment of FIGS. 1(a) and 1(b), a side shield 13 disposed at a side of each side face in a cross track direction of a main pole 11 is arranged at a far leading side compared with the main pole 11.

BRIEF DESCRIPTION OF THE DRAWINGS

FIG. 4(a) shows a diagram showing a relationship between Ls/Gs and a magnetic field at the track center, and FIG. 4(b) shows a diagram showing a relationship between Ls/Gs and a fringe field.

DETAILED DESCRIPTION OF THE INVENTION

Embodiments of the present invention relate to a perpendicular magnetic recording head that can provide a high recording field while suppressing adjacent track erasure, and a method of manufacturing the head.

When a leakage field to an adjacent track is suppressed by a side shield, a magnetic field for a recording track is reduced. An object of embodiments of the invention is to suppress reduction in recording field, and efficiently reduce the fringe field, and consequently suppress signal degradation in the adjacent track.

A perpendicular magnetic recording head of embodiments of the invention has a main pole of which the air-bearing surface has an inverted trapezoidal shape, a trailing shield situated at a trailing side of the main pole, and a side shield situated at both sides in a cross track direction of the main pole. A leading side end of the side shield is situated at a far leading side compared with a leading side end of the main pole.

A point nearest to a center line in the cross track direction of the main pole on the side shield may be situated at a far leading side compared with the leading side end of the main pole. In this case, may be desirable that a distance Ls between the leading side end of the main pole and the side shield end, and a distance Gs between the main pole and each side shield satisfy Ls>1.5×Gs. When a sub pole, of which the tip at an air-bearing surface side is situated at a position retracted from the air-bearing surface, is provided in the leading side end of the main pole, the distance Ls between the leading side end of the main pole and the side shield end is desirably larger than thickness of the sub pole.

According to embodiments of the invention, while a magnetic field and field gradient for a recording track are kept, field expansion occurring from the leading side end of the main pole can be reduced, and therefore the fringe field can be reduced. Thus, a magnetic recording head is obtained, which has an excellent recording property, and does not induce signal degradation in an adjacent track.

Hereinafter, particular embodiments of the invention will be described with reference to drawings.

Figure 1:
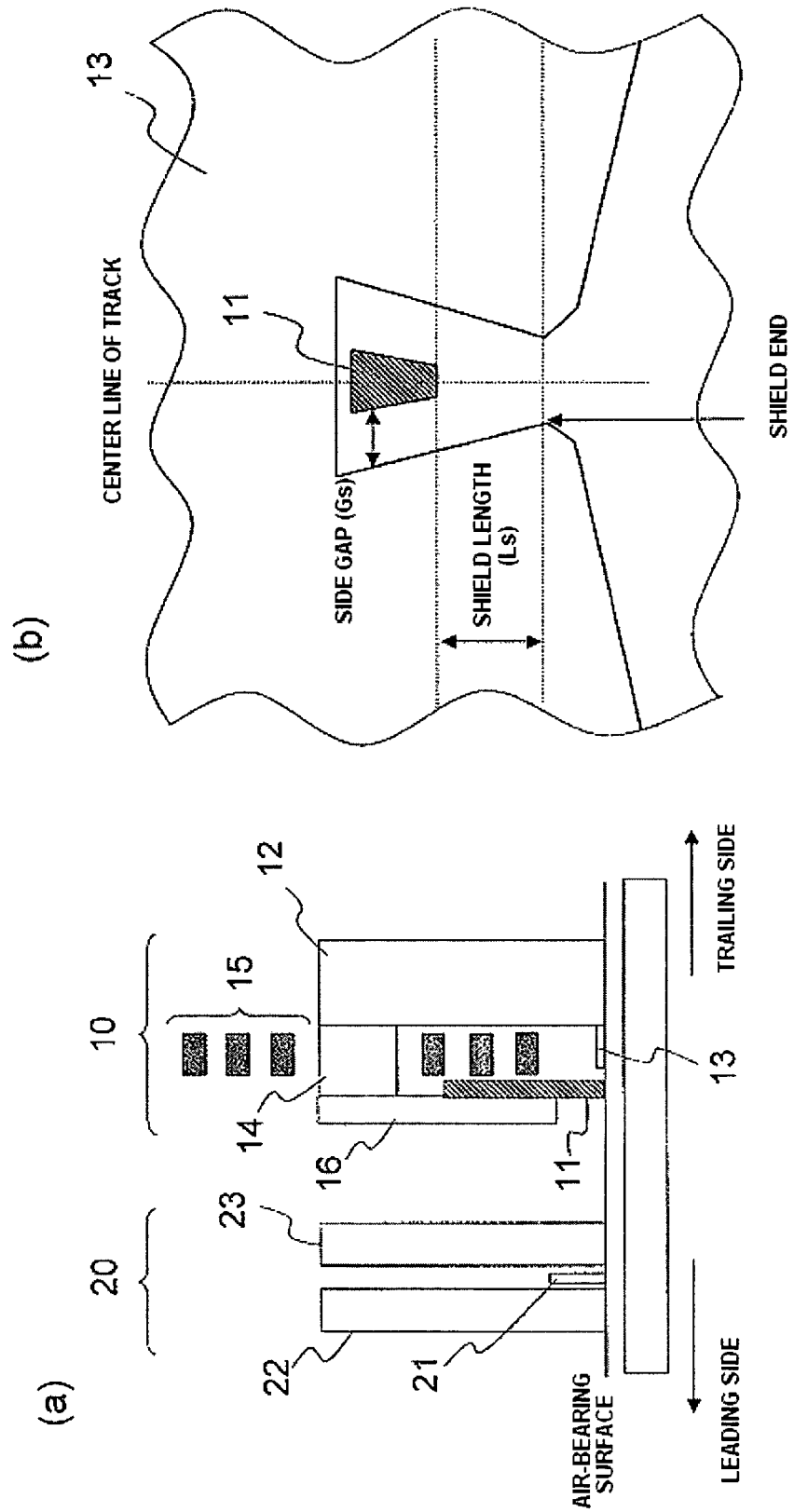
FIG. 1(a) shows a schematic section diagram at a track center of a magnetic head according to an embodiment of the invention.
FIG. 1(b) shows a schematic diagram of an air-bearing surface near a main pole.

FIG. 1(a) shows a schematic section diagram at a track center, showing an example of a magnetic head according to an embodiment of the invention. The magnetic head is a recording/reproducing composite head having a recording head 10 having a main pole 11 and an auxiliary pole 12, and a reproducing head 20 having a read element 21. For the reproducing head 20, CIP-GMR element, TMR element, CPP-GMR element or the like is used, which is disposed between a pair of magnetic shields including a lower shield 22 at a leading side and an upper shield 23 at a trailing side. A writing function section has a basic configuration including a main pole 11 that performs writing into a magnetic disk, a shield 13 situated at a position at a trailing side of the main pole and at a side of each side face in a cross track direction of the main pole with a predetermined space distant from the side face, the auxiliary pole 12 that returns magnetic flux from the magnetic disk, a back gap section 14 that magnetically couples the main pole to the auxiliary pole, and a coil 15 situated in a space formed by the main pole, auxiliary pole, and back gap section.

FIG. 1(b) shows a schematic diagram seen in an air-bearing surface direction, showing the recording operation section of the magnetic head shown in FIG. 1(a). The main pole 11 and the shield 13 are exposed to the air-bearing surface. Here, it is important that portions of the shield 13 at the sides of both side faces of the main pole are made in a shape where each of the portions covers an area to a far leading side compared with the main pole 11 in order to concentrate high field strength into a track center. Hereinafter, in the periphery of a leading side end of the shield 13, a point nearest to the center line in the cross track direction is called shield end. A distance Ls between a straight line parallel to the cross track direction at the leading side end of the main pole and the shield end is called shield length. A distance between an end in a trailing direction of the main pole 11 and the shield is called trailing gap, and a distance Gs between a side face in the cross track direction of the main pole 11 and the shield 13 is called side gap.

Figure 2:
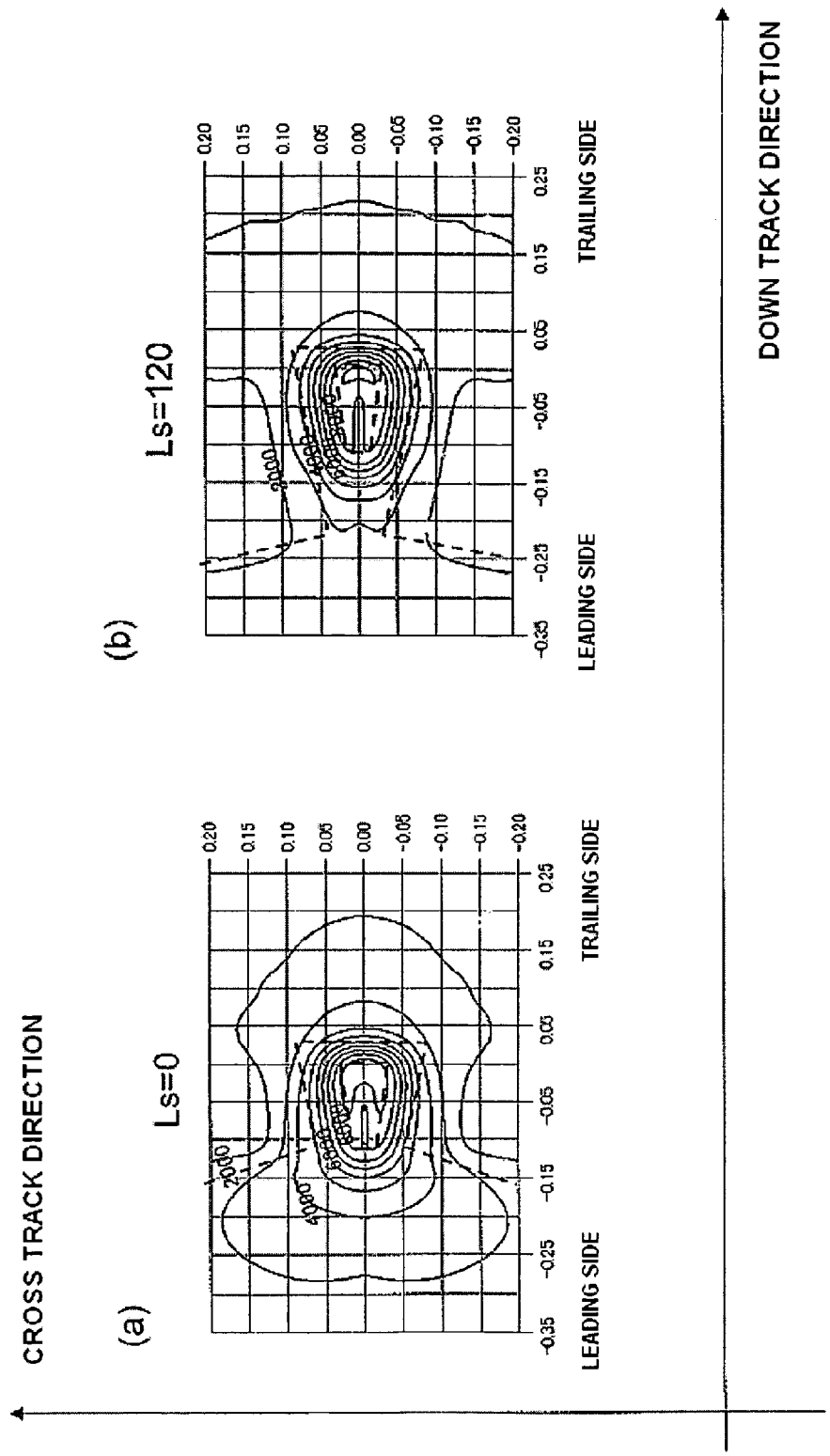
FIGS. 2(a) and 2(b) show head field distribution diagrams of the magnetic head according to an embodiment the invention.

Hereinafter, field distribution for the recording head of an embodiment of the invention is shown, the field distribution being obtained by field calculation using a finite element method. In a shape of the recording head used for the calculation, width of a main pole is 60 nm, thickness of the main pole is 120 nm, a side gap is 60 nm, and a trailing gap is 35 nm. FIGS. 2(a) and 2(b) show contour lines of head field distribution obtained by the field calculation. A shape of an air-bearing surface of the recording head is shown by a dot line. FIG. 2(a) shows a case of shield length Ls=0, and FIG. 2(b) shows a case of Ls=120 nm.

In the case of Ls=0, field expansion occurs in the cross track direction at the leading side end of the main pole. It is known that a magnetic field of 4000 Oe or more particularly expands at the leading side rather than the trailing side. The field expansion at the leading side is affected by skew formed in a slider during recording of the inner or outer circumference of a recording medium disk, which is a cause of increase of the recording width. On the other hand, as shown in FIG. 2(b), in the case of Ls=120, field expansion is not seen in the leading side. By comparison with a shape of an air-bearing surface of the recording head shown by a dot line, this is obviously given as a result of such a configuration that the side shield was disposed at a far leading side compared with the main pole.

Figure 3:
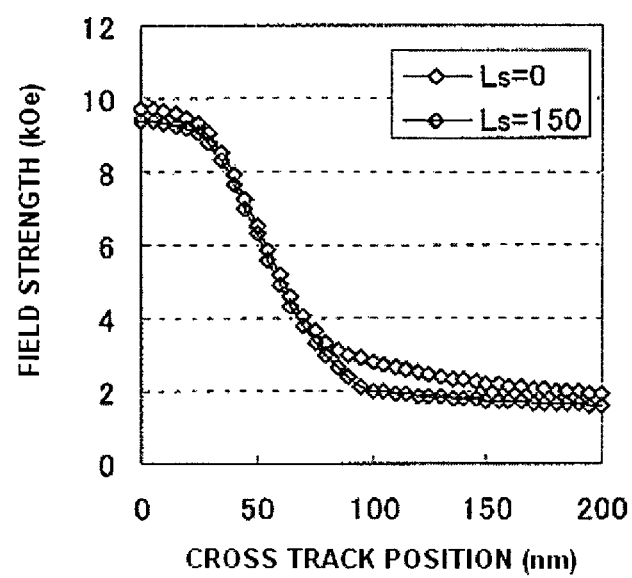
FIG. 3 shows a distribution diagram in a cross track direction of head field strength of the magnetic head according to an embodiment of the invention.

FIG. 3 shows distribution in a cross track direction of a head field. Blank rhombs show a case of shield length Ls=150 nm, and solid rhombs show a case of shield length Ls=0 nm. It is known that a shield end is disposed at a far leading side compared with the main pole, thereby a magnetic field is reduced in a region of 80 nm or more in the cross track direction. As a result, an unnecessary field applied to an adjacent track is suppressed, consequently degradation of a recording signal from the adjacent track can be prevented. Furthermore, it should be noted that since reduction in maximum field at the track center is small, high-quality recording can be performed into a target track.

This effect is obtained by an operation that the side shield is disposed such that it covers the trailing side of the main pole, thereby a structure of the side shield is simply made close to an ideal shield structure, that is, close to a shape where three sides of the main pole, namely, the leading side and both side-face sides in the cross track direction are covered with a constant interval from the side shield. Therefore, a remarkable effect is obtained by increasing Ls to about Gs. FIGS. 4(a) and 4(b) show Ls/Gs dependence of a head field at the track center and a head field (fringe field) at a position 100 nm distant from the track center in the cross track direction respectively, the Ls/Gs being obtained by normalizing Ls by the distance (Gs) between the main pole and the side shield in the cross track direction. As seen from FIG. 4(a), decrease in magnetic field at the track center due to increase in Ls is small, and in the case of Ls/Gs=3, the magnetic field is decreased by about 3%. On the other hand, the fringe field is greatly decreased, and it is seen that when Ls>1.5×Gs is set, a large effect of reduction in fringe field is obtained. As a criterion of the fringe field, an irreversible switching field is given. The irreversible switching field is a magnetic field at which when a medium being uniformly magnetized in a particular direction is applied with a magnetic field in a direction opposite to a magnetization direction, reversal of magnetization begins and thus total magnetization starts to be decreased. In a CoCr-based perpendicular recording medium being currently typically used, the irreversible switching field is approximately 3000 Oe. If a magnetic field of the approximately 3000 Oe is repeatedly applied, even if a switching field of a medium is sufficiently large compared with such a magnetic field, reversal of magnetization begins in individual particles, and consequently a recording pattern is degraded. Therefore, when Ls>1.5×Gs is set, signal degradation in an adjacent track can be prevented.

Next, a process of manufacturing a recording head having a structure of an embodiment of the invention is described. FIGS. 5(a)-5(f) show a process diagram showing an example of a method of manufacturing a main pole and a shield of the magnetic head of an embodiment of the invention.

Figure 5:
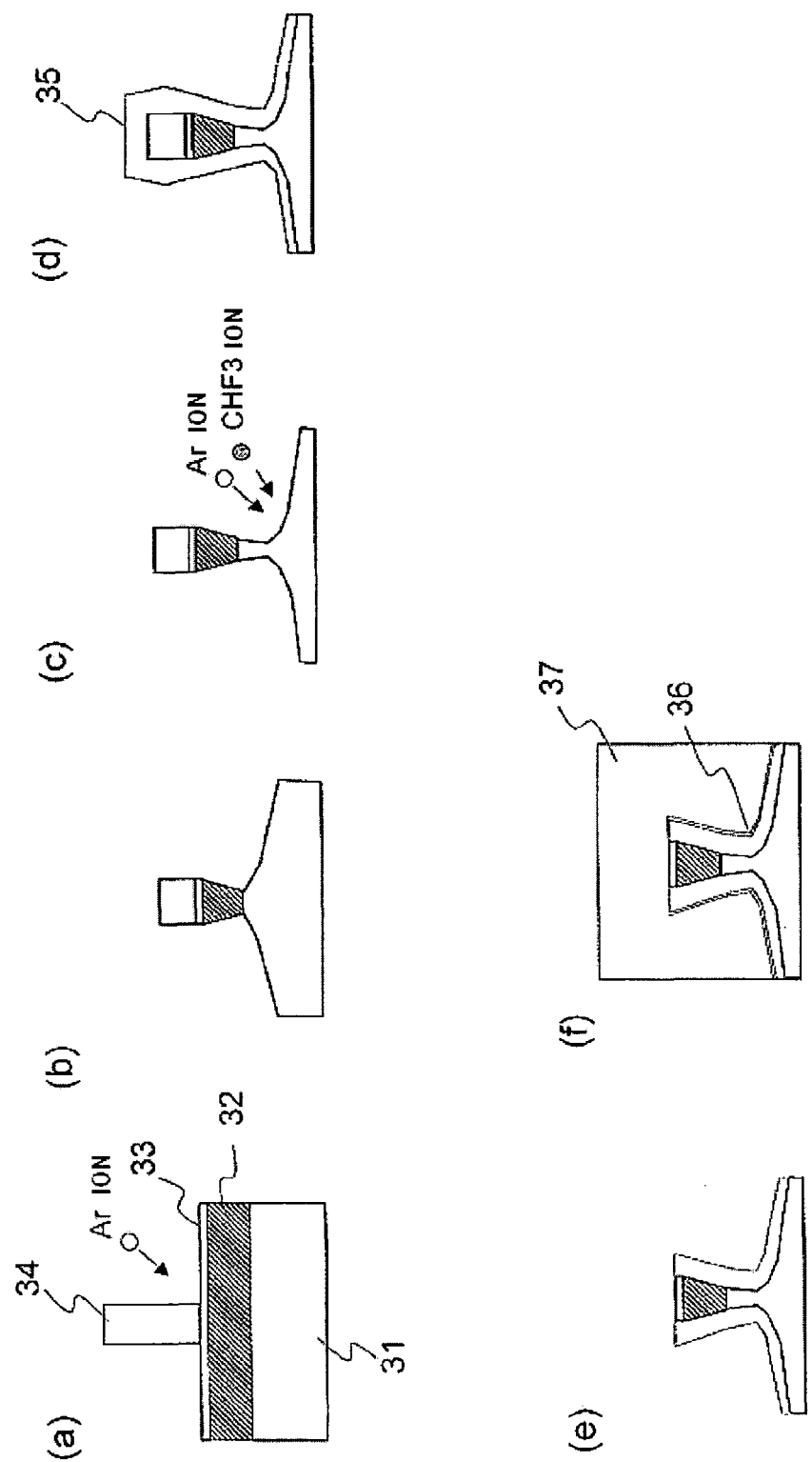
FIGS. 5(a)-5(f) show a process diagram showing an example of a method of manufacturing the magnetic head of an embodiment of the invention.

A magnetic film 32 for a main pole and a nonmagnetic film 33 for magnetically isolating between the main pole and a trailing side shield are deposited on an inorganic insulating film 31 (FIG. 5(a)). Then, a mask 34 corresponding to a predetermined track width is formed, and the magnetic film is thinned by ion milling. Such thinning is performed in a way that an inverted trapezoidal shape, in which width of the magnetic film is narrow in a lower part compared with in an upper part is formed (FIG. 5(b)). Furthermore, in the thinning, the inorganic insulating film 31 is desirably thinned deep near the magnetic film for a main pole. Typically, the inorganic insulating film is configured by alumina, and the magnetic film for a main pole is configured by CoFe, NiFe or NiCr, and a manufacturing process of processing the films by Ar ion milling is used. However, since an etching rate of alumina by Ar ion milling is typically about one third of that of the magnetic metal, alumina near the magnetic film for a main pole is hard to be thinned deep. Thus, after etching of the magnetic film for a main pole, alumina is desirably etched by reactive ion milling (RIM) using $Ar+CHF_3$ mixed gas. An etching rate of alumina by fluorine-based gas, particularly $CHF_3$, is extremely large compared with that of magnetic metal such as CoFe, NiFe, or NiCr, and an etching rate being at least 10 times as large as etching of the magnetic metal can be obtained in some condition. The inorganic insulating film near the main pole is desirably thinned at least two times deeper than Gs by etching using RIM or the like. In such etching, the inorganic insulating film under the main pole needs to be thinned at a right angle or a larger angle than it with respect to a film surface (FIG. 5(c)). Then, a nonmagnetic side gap film 35 is deposited (FIG. 5(d)), and then a mask above the main pole is removed by ion milling and a liftoff process (FIG. 5(e)). Furthermore, a base film for plating 36 is deposited by a sputtering method, and then a magnetic film for shielding 37 is formed by a plating method (FIG. 5(f)).

Figure 6:
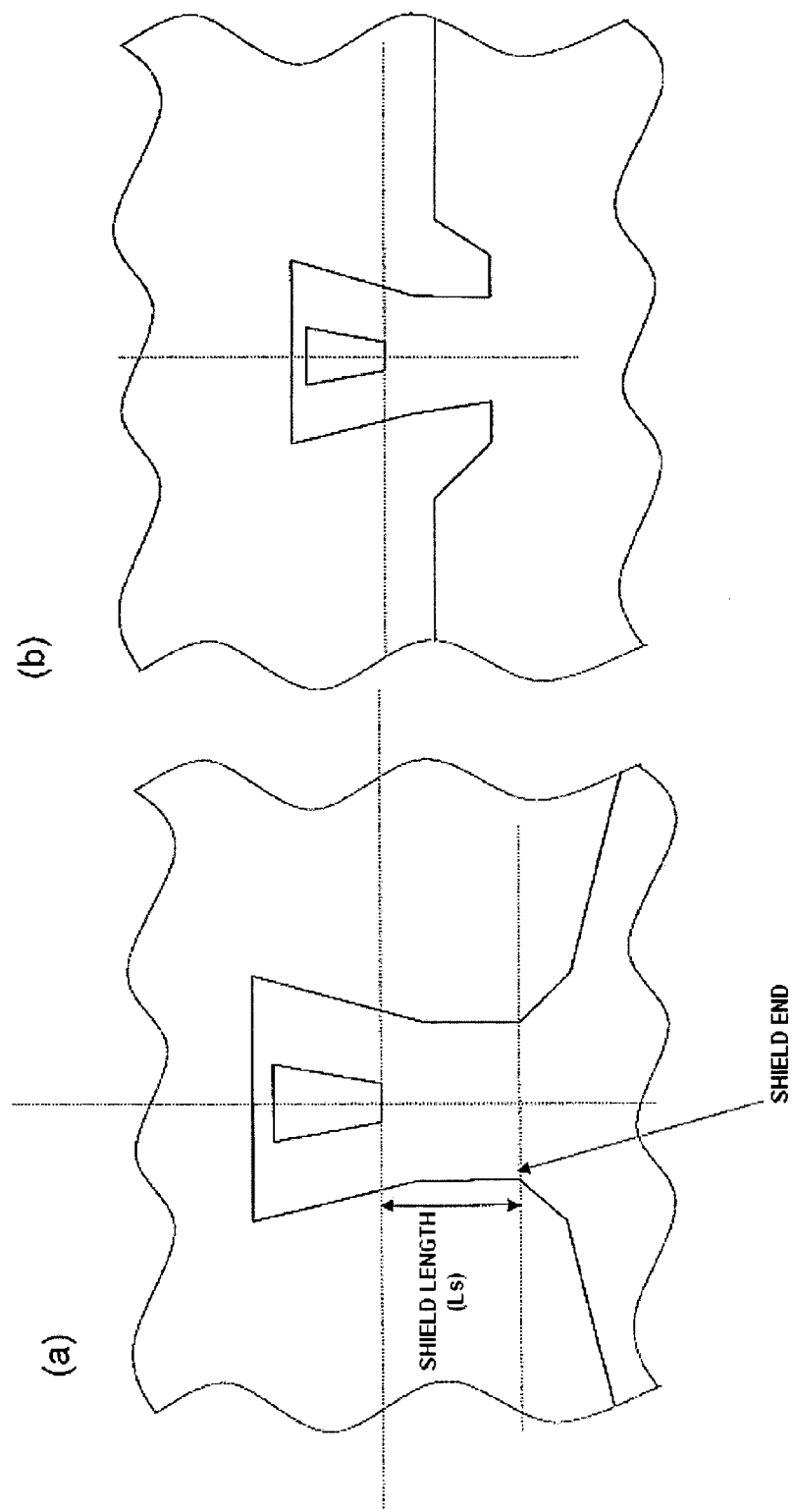
FIGS. 6(a) and 6(b) show diagrams showing another example of an air-bearing surface shape of a side shield of a magnetic head of an embodiment of the invention.

An effect of reducing the fringe field without reducing a maximum field, which is an object of embodiments of the invention, is obtained by a configuration where a leading-side end of the side shied is situated at a far leading side compared with the main pole. Therefore, a structure of a leading end or the periphery of the leading end is not particularly specified. FIGS. 6(a) and 6(b) show another example of a shape of a side shield that may provide an advantage of embodiments of the invention.

Figure 7:
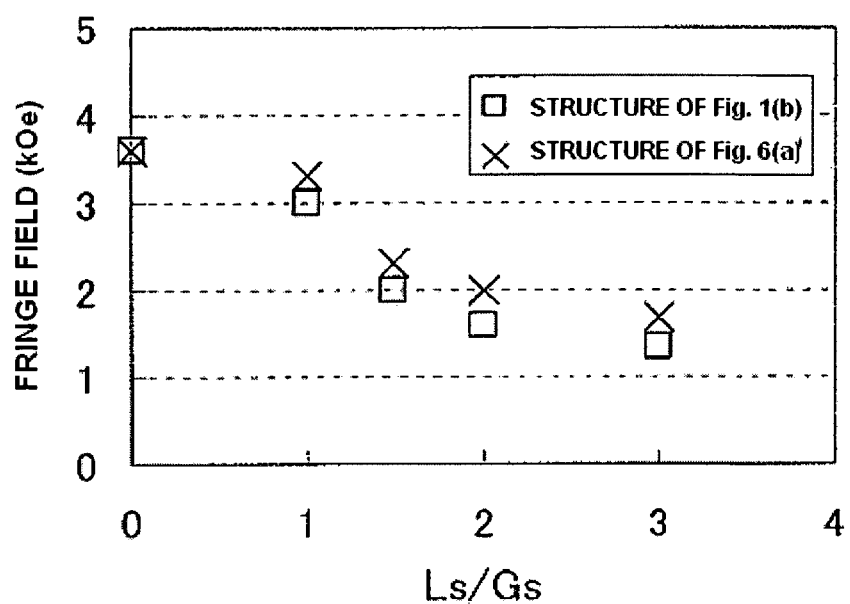
FIG. 7 shows a diagram showing shield length dependence of a fringe field in a shield structure of FIG. 6(a).

For example, as shown in FIG. 6(a), the shield end may be a side having a constant distance from the cross track direction. FIG. 7 shows shield-length dependence of the fringe field in a head having such a shield structure. While an effect is small compared with a structure as shown in FIG. 1(b) shown for comparison, it is seen that a significant effect is obtained.

Moreover, as shown in FIG. 6(b), the magnetic film may be disposed only in a region near the shield end, and a cutout may be formed in a place away from the main pole in the cross track direction.

Figure 8:
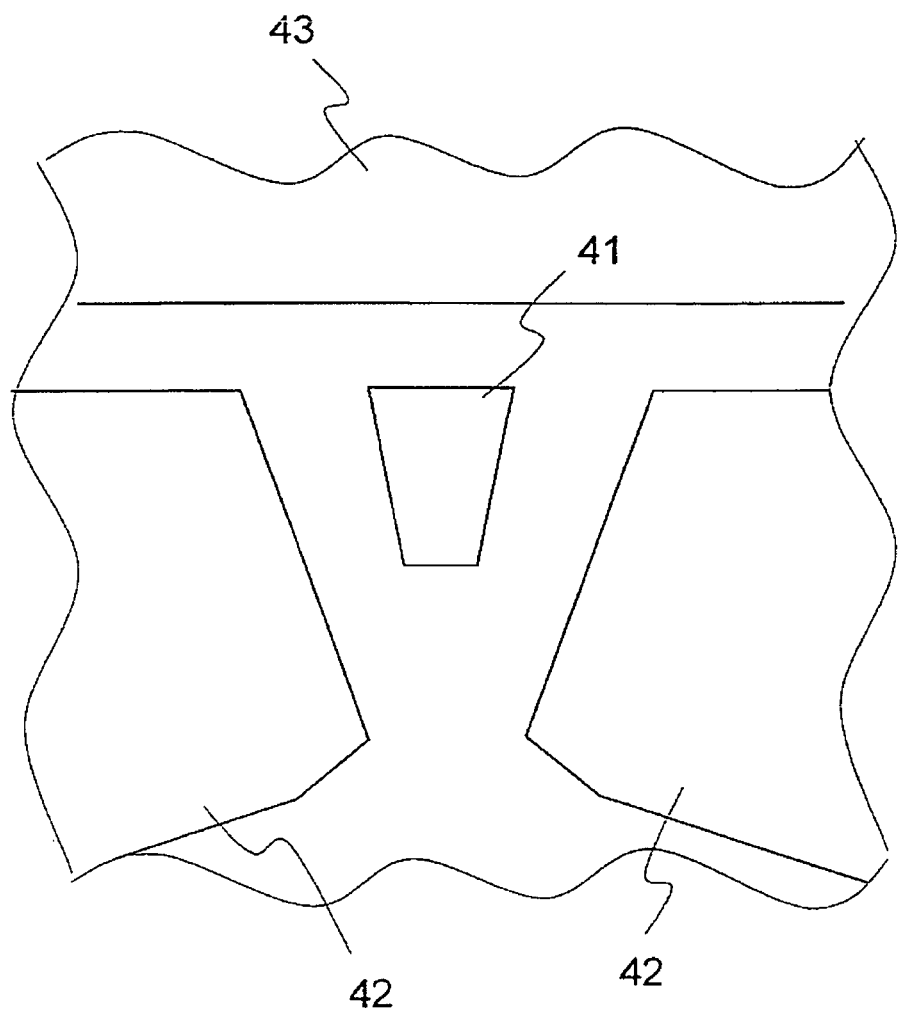
FIG. 8 shows a schematic diagram of an air-bearing surface of an example where a side shield is magnetically separated from a trailing shield in a magnetic head of an embodiment of the invention.
Figure 9:
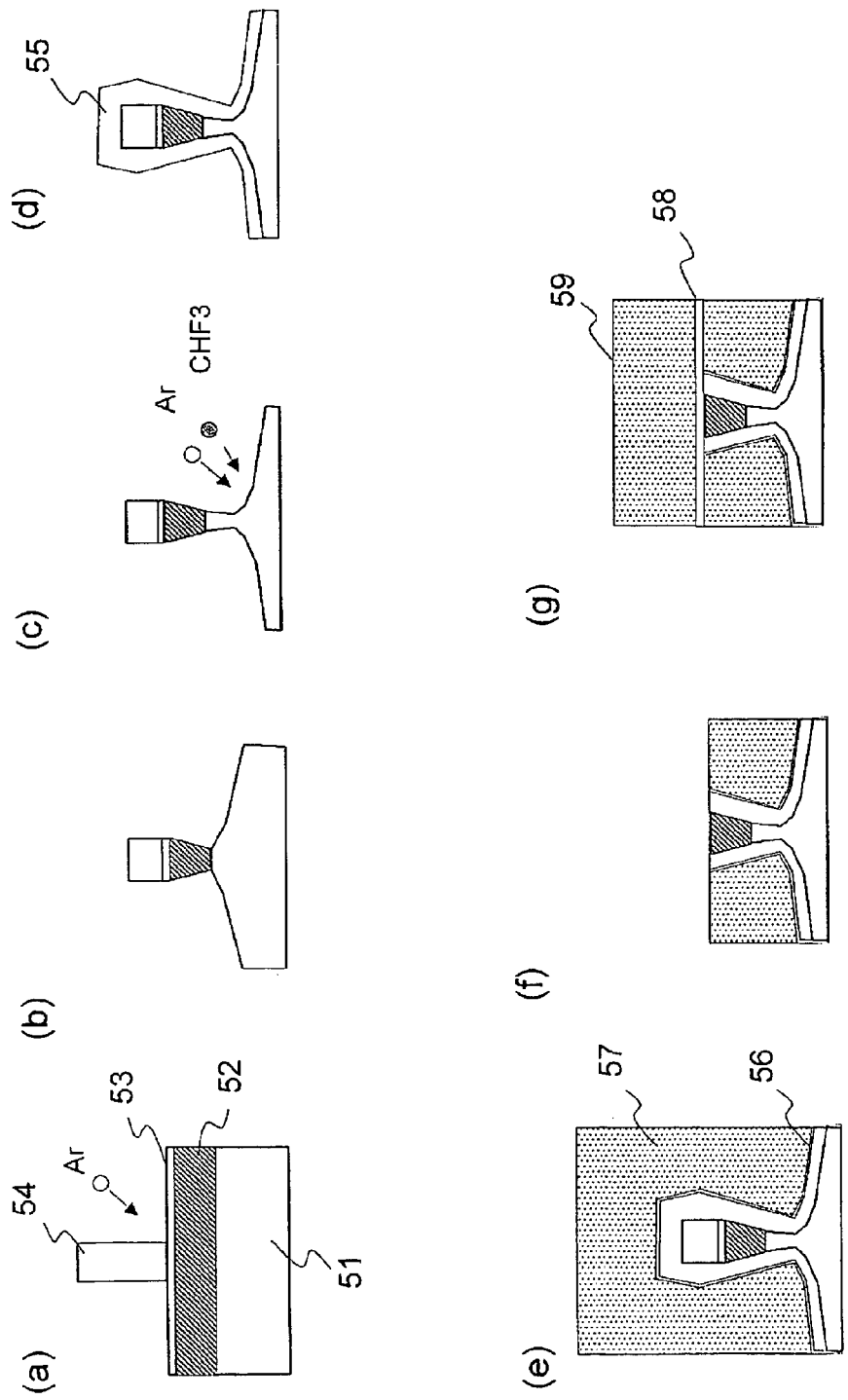
FIGS. 9(a)-9(g) show a process diagram showing an example of a method of manufacturing a structure where the side shield is magnetically separated from the trailing shield in the magnetic head of an embodiment of the invention.

FIG. 8 shows another example of embodiments of the invention. In the example, a side shield 42 disposed at each side in a cross track direction of a main pole 41 is separated from a trailing shield 43 disposed in a down track direction. Even in such a structure, the periphery of a leading side end of the main pole is covered by the side shield, thereby the fringe field to an adjacent track can be reduced.

FIGS. 9(a)-9(g) show a manufacturing process of the recording head as shown in FIG. 8. A magnetic film 52 for a main pole and a cap film 53 are deposited on an inorganic insulating film 51 (FIG. 9(a)). Then, a mask 54 corresponding to a predetermined track width is formed, and the magnetic film is thinned by ion milling. Such thinning is performed in a way that an inverted trapezoidal shape is formed, in which width of the magnetic film is narrow in a lower part compared with in an upper part (FIG. 9(b)). Then, a base film for the inorganic insulating film in the periphery of the main pole is etched by reactive ion milling using a fluorine-based mixed gas such as $Ar+CHF_3$. In such etching, the inorganic insulating film under the main pole needs to be thinned at a right angle or a larger angle than it with respect to a film surface (FIG. 9(c)). Furthermore, a nonmagnetic side gap film 55 (FIG. 9(d)) and a base film for plating 56 are deposited by a sputtering method, and then a magnetic side shield film 57 is deposited by a plating method (FIG. 9(e)). Then, the side shield film 57 is planarized by CMP with a surface of a trailing edge of the main pole as a reference (FIG. 9(f)). Then, a nonmagnetic gap film 58 to be a trailing shield gap is deposited by a sputtering method, and then a magnetic film 59 is deposited by a plating method (FIG. 9(g)).

Figure 10:
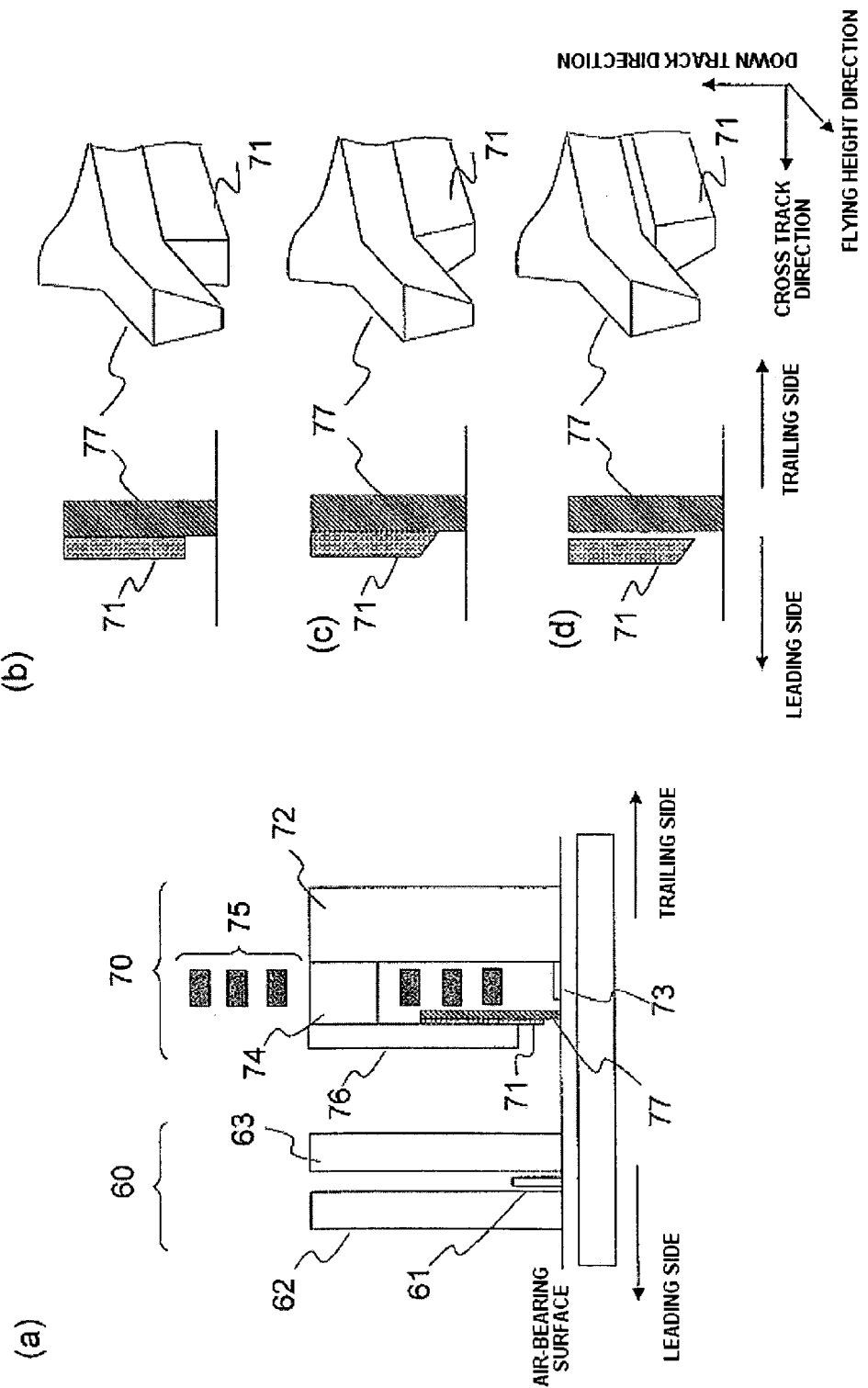
FIGS. 10(a)-10(d) show diagrams showing a magnetic head of an embodiment of the invention, in which a sub pole is disposed at a leading side of a main pole.

FIG. 10(a) shows an example of a recording head structure of an embodiment of the invention added with a sub pole at a leading end side of a main pole. In this structure, a sub pole 71 is inserted between a main pole 77 and a main pole yoke section 76, of which the tip exists at a position retracted from an air-bearing surface. In the structure, a case that an end at an air-bearing surface side of the sub pole 71 is parallel to the air-bearing surface (FIG. 10(b)), and a case that the end is inclined such that a distance from the air-bearing surface is increased toward the leading side (FIG. 10(c)) are considered. The main pole may be isolated from the sub pole by a nonmagnetic film about 10 nm thick (FIG. 10(d)). Thus, magnetic flux is concentrated into an end portion of the main pole, consequently a high magnetic field can be generated. However, typically, in such a structure added with the sub pole, while a maximum field of a head is increased, field expansion is also increased, and consequently track density cannot be increased. Even regarding this, as in embodiments of the invention, the side shield end is disposed at a far leading side compared with the main pole, thereby a recording field can be increased while suppressing the field expansion.

Hereinafter, a result of estimating such an effect by field calculation is shown. Objects of comparison include a head (hereinafter, called previous head) having a main pole in a previous structure having no sub pole, and a side shield in a previous structure; a head having a main pole added with the sub pole, and a side shield in the previous structure (sub-pole-added head), and a head having a main pole added with the sub pole, and the side shield as shown in FIG. 1(b) (inventive head).

Figure 11:
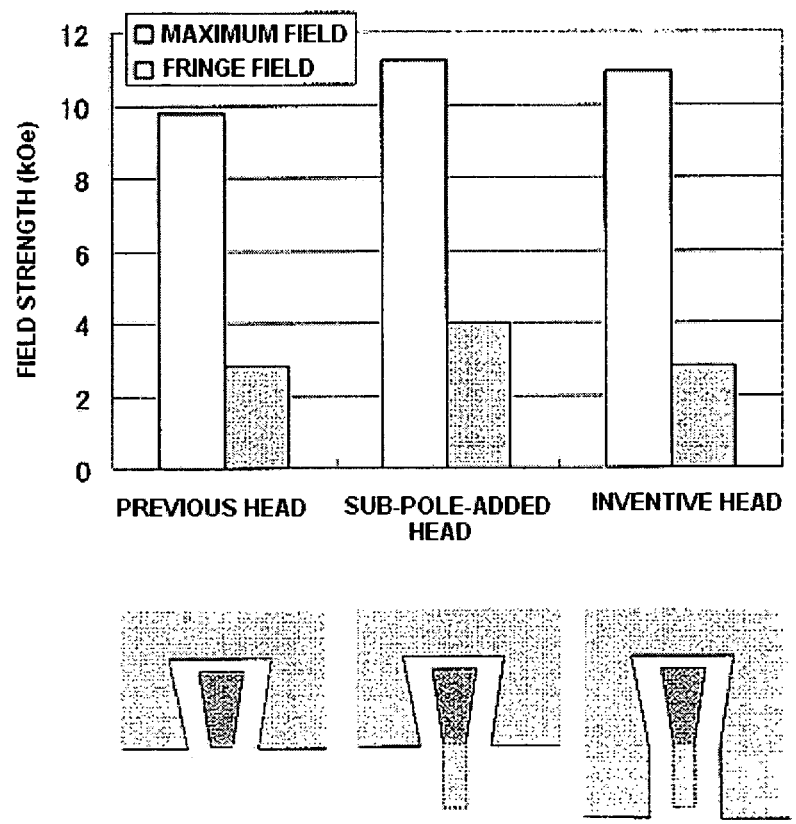
FIG. 11 shows a diagram showing a maximum field and a fringe field of each of the magnetic head according to an embodiment of the invention and a head of a comparative example.

FIG. 11 shows maximum field strength and a fringe field of each head. In the sub-pole-added head, while the maximum field strength is increased by about 15% due to the added sub pole, the fringe field is also increased by 40% or more. This is because since magnetic flux generated by the sub pole directly flows into the air-bearing surface without flowing via a tip of the main pole, a magnetic field expands near the leading end of the main pole. On the other hand, in the inventive head, while maximum field strength is increased by about 10%, increase in fringe field is substantially not found. This is obtained as a result of suppressing field expansion in the cross track direction by disposing a side shield near the leading side end of the main pole.

Figure 12:
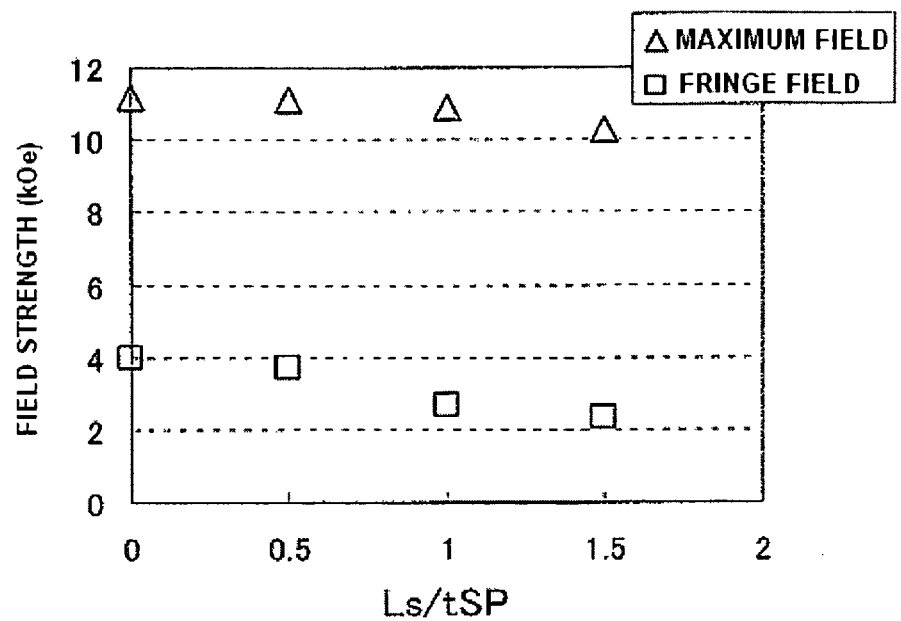
FIG. 12 shows a diagram showing a relationship between the maximum field or fringe field and Ls/tSP in the magnetic head according to an embodiment of the invention.

In the case of providing such a sub pole, the length of the side shield (Ls) is may be made to be at least 1.5 times as large as the side shield gap, and equal to or larger than thickness of the sub pole (tSP). FIG. 12 shows side-shield-length dependence of the maximum field and the fringe field respectively. A horizontal axis shows the length Ls in a manner of being normalized by thickness of the sub pole tSP. While the maximum field gradually decreases with increase in Ls/tSP, the fringe field greatly decreases with increase in Ls/tSP. Accordingly, a head having the relevant structure can effectively reduce the fringe field while suppressing reduction in maximum field. In this case, the effect of reduction in fringe field is significant in a region of Ls/tSP>1. This means that when the side shield exists in a leading side over a length corresponding to thickness of the auxiliary pole or more at the air-bearing surface, the effect of reduction in fringe field is large. This is because a region between the whole sub pole and the air-bearing surface is covered by the shield, thereby magnetic flux that directly flows from the sub pole into the air-bearing surface can be blocked.

In the CoCr-based perpendicular recording medium being currently typically used, the fringe field is desirably made to be 3000 Oe or less. The reason for this is that the irreversible switching field of the CoCr-based perpendicular recording medium is typically about 3000 Oe, and when a magnetic field of 3000 Oe or more is repeatedly applied, residual magnetization is decreased, and consequently a signal may be degraded. In the recording head of the invention, Ls/tSP>1 is set, thereby the fringe field can be controlled to be 3000 Oe or less, and consequently signal degradation in an adjacent track with reduction in track pitch can be suppressed.

An advantage of embodiments of the invention becomes more significant by using a magnetic material having high saturation magnetization in a region near the leading side end of the side shield compared with other regions. The reason for this is that the object of embodiments of the invention is to strongly absorb magnetic flux from the leading side that scarcely contributes to the maximum field compared with the trailing side. That is, a shield may be formed of a magnetic material having small saturation magnetization in a region near the trailing side end of the main pole, which dominates the maximum field strength, and a shield may be formed of a magnetic material having a large saturation magnetization in a region near the leading side end of the main pole, at which field expansion is large in the track width direction. Specifically, such a shield can be manufactured by plating a multilayer film in the plating step of the magnetic film for shielding, for example, as shown in FIG. 5(f). For example, first, a magnetic material having a large saturation magnetization (1.6 to 2.4 T) such as CoFe or CoFeNi can be deposited, then a magnetic material having a comparatively small saturation magnetization (1.0 to 1.5 T) such as $Ni_{80}Fe_{20}$ or $Ni_{45}Fe_{55}$ can be deposited.

What is claimed is:

1. A perpendicular magnetic recording head comprising:
    a main pole having an air-bearing surface in an inverted trapezoidal shape;
    a trailing shield situated at a trailing side of the main pole;
    a side shield situated at both sides in a cross track direction of the main pole; and
    a leading end gap situated between opposing edges of a leading portion of the side shield, wherein the leading end gap extends from a leading side end of the main pole in a leading track direction to a first vertex of each opposing edge of the leading portion of the side shield,
    wherein each opposing edge of the leading portion of the side shield are opposite to a corresponding opposing edge of the side shield on the other side of the main pole in the cross track direction,
    wherein the first vertex of each opposing edge of the leading portion of the side shield is defined where two portions of the respective edge intersect at a leading side end of the side shield,
    wherein a width in the cross track direction between the opposing edges of the leading portion of the side shield is at a minimum at the first vertices,
    wherein a gap positioned on either side of the main pole in the cross track direction between the main pole and the side shield has a constant width in the cross track direction for a thickness of the main pole in a track direction,
    wherein the leading portion of the side shield further comprises second vertices where two portions of each respective opposing edge of the leading portion intersect, each second vertex being positioned farther from the leading side end of the main pole in the track direction than the first vertex of the respective opposing edge, and
    wherein a distance Ls between the leading side end of the main pole and the first vertex of each opposing edge of the side shield, and a distance Gs between the main pole and the side shield in the cross track direction satisfy Ls>1.5xGs.

2. The perpendicular magnetic recording head according to claim 1, wherein a width in the cross track direction between the second vertices is equal to or greater than the width between the opposing edges of the leading portion of the side shield at the first vertices.

3. The perpendicular magnetic recording head according to claim 2, wherein:
    a region of the side shield near the leading side end of the side shield comprises a magnetic material having a saturation magnetization in a range from 1.6 T to 2.4 T, and
    a region of the side shield near a trailing side end of the side shield comprises a magnetic material having a saturation magnetization in a range from 1.0 T to 1.5 T.

4. The perpendicular magnetic recording head according to claim 2, wherein:
    a sub pole is provided at the leading side end of the main pole, and
    a tip at an air-bearing surface side of the sub pole is situated at a position retracted from an air-bearing surface,
    wherein a distance in the track direction between the leading side end of the main pole and a leading edge of the sub pole is less than a distance in the track direction between the leading side end of the main pole and the leading edge of the side shield, and
    wherein a distance Ls between the leading side end of the main pole and each first vertex is larger than a thickness of the sub pole in the track direction.

5. The perpendicular magnetic recording head according to claim 4, wherein the sub pole is in direct contact with the main pole.

6. The perpendicular magnetic recording head according to claim 4, wherein a non-magnetic layer having a thickness of about 10 nm is disposed between the sub pole and the main pole.

7. The perpendicular magnetic recording head according to claim 2, wherein the side shield is coupled with the trailing shield at an air-bearing surface.

8. The perpendicular magnetic recording head according to claim 2, wherein the side shield is separated from the trailing shield by a nonmagnetic material at the air-bearing surface, and wherein all portions of the opposing edges of the leading portion of the side shields are situated facing opposite each other in a cross-track direction such that lines extending perpendicular to each of the opposing edges of the leading portion of the side shields intersect each other at a center line in the cross-track direction.

9. The perpendicular magnetic recording head according to claim 2, wherein:
the side shield is configured by a multi-layer film of a plurality of different magnetic materials, and
saturation magnetization of a magnetic material disposed at the leading portion is higher than saturation magnetization of a magnetic material disposed at a trailing portion thereof.

10. The perpendicular magnetic recording head according to claim 2, wherein the leading portion of the side shield comprises a magnetic material having a high saturation magnetization as compared with other regions of the side shield.

11. The perpendicular magnetic recording head according to claim 2, wherein the leading portion of the side shield further comprises third vertices where two portions of each respective opposing edge of the leading portion intersect, each third vertex being positioned closer to the leading side end of the main pole than the first vertex of the respective opposing edge.

12. The perpendicular magnetic recording head according to claim 11, wherein a width in the cross track direction between the third vertices is equal to or greater than the width between the opposing edges of the leading portion of the side shield at the first vertices.

13. A method of manufacturing a perpendicular magnetic recording head according to claim 1, the method comprising:
depositing a magnetic film for the main pole on an inorganic insulating film,
depositing a nonmagnetic film thereon,
forming a mask corresponding to track width thereon,
processing the magnetic film for a main pole into an inverted trapezoidal shape by ion milling using the mask,
thinning the inorganic insulating film under the processed magnetic film for the main pole by reactive ion milling at a right angle or a larger angle than it,
depositing a nonmagnetic film to be the gap, and
forming a magnetic film for shielding.

14. The method of manufacturing a perpendicular magnetic recording head according to claim 13, wherein forming the magnetic film for shielding includes:
removing the mask,
depositing a base film for plating, and
forming a magnetic film for the trailing shield by a plating method.

15. The method of manufacturing a perpendicular magnetic recording head according to claim 13, wherein forming the magnetic film for shielding includes:
depositing a base film for plating,
forming a magnetic film for the side shield by a plating method,
exposing the magnetic film for a main pole by CMP,
depositing a nonmagnetic film, and
forming a magnetic film for the trailing shield by the plating method.

16. A perpendicular magnetic recording head comprising:
a main pole having an air-bearing surface in an inverted trapezoidal shape;
a trailing shield situated at a trailing side of the main pole;
a side shield situated at both sides in a cross track direction of the main pole; and
a leading end gap situated between opposing edges of a leading portion of the side shield, wherein the leading end gap extends from a leading side end of the main pole in a leading track direction to a first vertex of each opposing edge of the leading portion of the side shield,
wherein each opposing edge of the leading portion of the side shield are opposite to a corresponding opposing edge of the side shield on the other side of the main pole in the cross track direction,
wherein the first vertex of each opposing edge of the leading portion of the side shield is defined where two portions of the respective edge intersect at a leading side end of the side shield,
wherein a width in the cross track direction between the opposing edges of the leading portion of the side shield is at a minimum at the first vertices,
wherein a gap positioned on either side of the main pole in the cross track direction between the main pole and the side shield has a constant width in the cross track direction for a thickness of the main pole in a track direction,
wherein a distance Ls between the leading side end of the main pole and the first vertex of each opposing edge of the side shield, and a distance Gs between the main pole and the side shield in the cross track direction satisfy Ls>1.5×Gs,
wherein the leading portion of the side shield further comprises second vertices, third vertices, and fourth vertices,
wherein the second vertices are located where two portions of each respective opposing edge of the leading portion intersect, each second vertex being positioned farther from the leading side end of the main pole than the first vertex of the respective opposing edge,
wherein the third vertices are located where two portions of each respective opposing edge of the leading portion intersect, each third vertex being positioned closer to the leading side end of the main pole than the first vertex and the second vertex of the respective opposing edge, and
wherein the fourth vertices are located where two portions of each respective leading edge of the leading portion intersect, each fourth vertex being positioned closer in the track direction to a line which extends along the leading side end of the main pole in the cross track direction than the first vertex.

17. The perpendicular magnetic recording head according to claim 16, wherein a width in the cross track direction between the fourth vertices is greater than the width between the opposing edges of the leading portion of the side shield at the first vertices.

18. The perpendicular magnetic recording head according to claim 16, wherein:
a sub pole is provided at the leading side end of the main pole, and
a tip at an air-bearing surface side of the sub pole is situated at a position retracted from an air-bearing surface,
wherein a distance in the track direction between the leading side end of the main pole and a leading edge of the sub pole is less than a distance in the track direction between the leading side end of the main pole and the leading edge of the side shield, and
wherein a distance Ls between the leading side end of the main pole and each first vertex is larger than a thickness of the sub pole in the track direction.

* * * * *